United States Patent
Konuma et al.

[11] Patent Number: 5,827,448
[45] Date of Patent: Oct. 27, 1998

[54] FERROELECTRIC LIQUID CRYSTAL DEVICE

[75] Inventors: Toshimitsu Konuma, Kanagawa; Akira Mase, Aichi; Shunpei Yamazaki, Tokyo; Misao Yagi, Kanagawa; Hitoshi Kondo; Mika Tadokoro, both of Tokyo; Hiroko Konuma, Kanagawa; Hiroshi Sugiyama, Tokyo; Toshimitsu Hagiwara, Kanagawa, all of Japan

[73] Assignee: Semiconductor Energy Laboratory Co., Ltd., Japan

[21] Appl. No.: 791,189

[22] Filed: Nov. 13, 1991

[30] Foreign Application Priority Data

Nov. 16, 1990 [JP] Japan .................................. 2-312533

[51] Int. Cl.$^6$ .......................... C09K 19/34; C09K 19/52; C09K 19/36; G02F 1/1337
[52] U.S. Cl. ............... 252/299.61; 252/299.01; 252/299.4; 359/75
[58] Field of Search ................. 252/299.61, 299.01, 252/299.4; 359/75

[56] References Cited

U.S. PATENT DOCUMENTS

| 4,831,182 | 5/1989 | Higuchi et al. ........................... 560/59 |
| 4,941,736 | 7/1990 | Taniguchi et al. .................. 359/103 X |
| 5,064,569 | 11/1991 | Geelhaar et al. ................... 252/299.65 |
| 5,120,466 | 6/1992 | Katagiri et al. ..................... 252/299.01 |
| 5,120,468 | 6/1992 | Saito et al. .......................... 252/299.61 |
| 5,130,048 | 7/1992 | Wand et al. ........................ 252/299.01 |
| 5,132,147 | 7/1992 | Takiguchi et al. ................... 427/393.5 |
| 5,133,895 | 7/1992 | Ogawa et al. ........................ 252/299.4 |
| 5,135,678 | 8/1992 | Murata et al. ........................ 252/299.4 |
| 5,169,556 | 12/1992 | Mochizuki et al. ............... 252/299.62 |

FOREIGN PATENT DOCUMENTS

| 0267585 | 5/1988 | European Pat. Off. . |
| 0326086 | 8/1989 | European Pat. Off. . |

*Primary Examiner*—C. H. Kelly
*Attorney, Agent, or Firm*—Sixbey, Friedman, Leedom & Ferguson, P.C.; Gerald J. Ferguson, Jr.; Joan K. Lawrence

[57] ABSTRACT

A ferroelectric liquid crystal device is described. The device comprises a pair of substrates, an electrode arrangement formed on the inside surface of the substrates, an orientation control surface provided on the inside surface of one of said substrates, and a blended ferroelectric liquid crystal disposed between the substrates. By suitably preparing the liquid crystal, multi-micro-domains are formed in the liquid crystal. By virtue of the multi-micro-domains, the contrast ratio and the response speed are significantly improved.

17 Claims, 7 Drawing Sheets

FERROELECTRIC LIQUID CRYSTAL DEVICE

BACKGROUND OF THE INVENTION

1. Field of the Invention

The present invention relates in general to a ferroelectric liquid crystal device. More particularly, it relates to such a ferroelectric liquid crystal device improved with respect to driving characteristics.

2. Description of the Prior Art

As conventional liquid crystal displays, displays utilizing twisted nematic liquid crystal materials are well known in the field. The displays of this type often exhibit cross-talk between adjacent pixels when driven in matrix configuration having a large number of pixels, so that the available pixel number is substantially limited.

Displays of the active matrix type provided with thin film transistors for driving respective pixels are also known. Fabrication of the displays of this type, however, may present difficulties owing to low yield of transistors formed on substrate particularly when the size of the substrate is increased. Needs for relatively large equipment investment also make it difficult to proceed with this type.

A new type display device utilizing ferroelectric, chiral smectic C liquid crystal has been suggested by N. A. Clark et al, in U.S. Pat. No. 4,367,924. In this device, the smectic liquid crystal material is layered, and the layers 12 are aligned perpendicular to opposed surfaces 11 and 11' of the cell as shown in FIG. 1. The liquid crystal molecules lie flat on the surfaces and are restricted at the surface to only two positions (i.e. first and second states (I) and (II) in which the liquid crystal molecules are inclined at $\theta$ and $-\theta$ from the layer normal) out of the cone of possible orientations that the chiral smectic state allows as illustrated in FIG. 2. The surfaces of the cell have to be closely spaced so that the bulk of the sample follows the molecular orientation at the surface, thereby creating the two surface stabilized states. The influence of the surfaces also helps to suppress the helix of the chiral smectic material so that the two states are not disrupted. The dipole moment of spontaneous polarization, namely c-director, points normal to the surfaces, up in the first state and down in the second state for example. Hence, the device can be switched between the two states with a pulsed electric field applied via electrode on the surface. The influence of the closely spaced surfaces causes the switched state to latch so that the state is maintained after the pulse is over, indicating memory characteristics.

In such ferroelectric liquid crystal device, it is required to accomplish uniform driving performance throughout the entirety of the device, so that efforts have been made to obtain a liquid crystal layer having a uniform liquid crystal orientation with no defects throughout the entire device, i.e. a mono-domain of the liquid crystal.

The mono-domain, however, can not be formed due to defects in the ferroelectric liquid crystal caused by small flaws occurring in an orientation film, stepwise unevenness of the electrodes for driving the liquid crystal, spacers provided for maintaining the appropriate gap between the substrates or other causes. An approach to form the mono-domain is to let crystals grow in one direction by virtue of a gradient of temperature. This approach can not be applied for the case of large devices in industrial production, but only for the cases of small devices of about several centimeter squares.

Even if mono-domain can be formed, the layered structure of the liquid crystal often incurs zig-zag defects because the ferroelectric liquid crystal is inherently not aligned in parallel to the substrate to form alignment thereof inclined at a certain angle so that bending or displacement was caused. For this reason, displaying and driving characteristics become non-uniform.

BRIEF SUMMARY OF THE INVENTION

It is therefore an object of the present invention to provide a ferroelectric liquid crystal device capable of displaying high contrast images uniformly appearing throughout the device.

It is another object of the present invention to propose a new molecular structure of liquid crystal materials suitable for application in optical displays.

Additional objects, advantages and novel features of the present invention will be set forth in the description which follows, and in part will become apparent to those skilled in the art upon examination of the following or may be learned by practice of the present invention. The object and advantages of the invention may be realized and attained by means of the instrumentalities and combinations particularly pointed out in the appended claims.

To achieve the foregoing and other object, and in accordance with the present invention, as embodied and broadly described herein, a ferroelectric liquid crystal device comprises a pair of substrates, an electrode arrangement formed on the inside surface of the substrates, an orientation control surface provided on the inside surface of at least one of said substrates, and a blended ferroelectric liquid crystal disposed between the substrates. By suitably preparing the liquid crystal, multi-micro-domains are formed in the liquid crystal. By virtue of the multi-micro-domains, the contrast ratio and the response speed are significantly improved.

Liquid crystals can have multi-domains in its smectic phase where batone is grown in a variety of directions at random. Multi-micro-domains, introduced by the present invention, are different from such conventional multi-domains. In the multi-micro-domains, respective domains have crystalline axes approximately directed in a common direction. Each domain appears as a fine structure of a short dimension of several micrometers to several tens of micrometers in the layer direction and a long dimension extending for 5–500 times the short dimension in the layer normal.

The inventors have obtained through many efforts such a new structure which can be formed when particular substances are included in the liquid crystal materials. By the new structure comprising the multi-micro-domains, excellent switching contrast was observed.

Next, the ferroelectric liquid crystal material in accordance with the present invention will be explained. The liquid crystal material comprises an optically active first liquid crystal represented by the following formula (I) at 2–30 mol %, an achiral base second liquid crystal represented by the following formula (II) at 55–80 mol % and a third liquid crystal represented by the following formula (III) at 2–15 mol %.

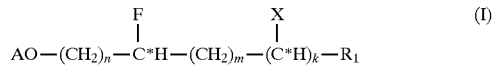

In the above formula (I), "A" stands for

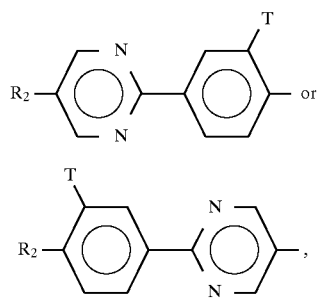

wherein $R_1$ is a straight chain alkyl group comprising 2–8 carbon atoms; $R_2$ is a straight chain alkyl group comprising 8–12 carbon atoms; T is a hydrogen atom or a fluorine atom; X is a fluorine atom or a methyl group; n=1 or 2; m=0–3; k=0–1; and C* is an asymmetric carbon atom.

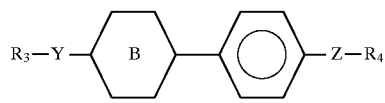 (II)

In the above formula (II),

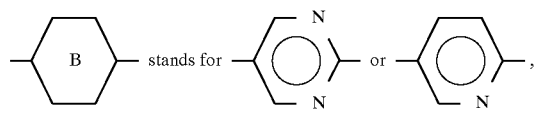

wherein $R_3$ and $R_4$ are straight chain or branched chain alkyl groups comprising 6–14 carbon atoms; Y and Z are a single bond or a —O— respectively.

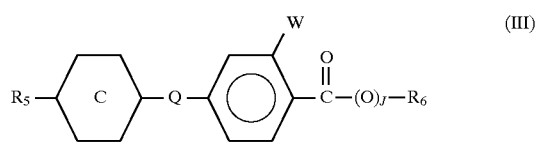 (III)

In the above formula (III),

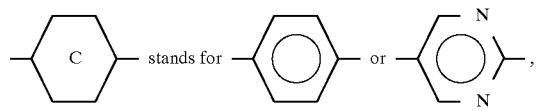

wherein $R_5$ is a straight chain alkyl or alkoxyl group comprising 6–14 carbon atoms; $R_6$ is a straight chain or branched chain alkyl group comprising 6–14 carbon atoms; Q is a single bond or —COO—; W is a hydrogen atom or a fluorine atom; J=0 or 1.

The alkyl group of $R_6$ may comprise an asymmetric carbon atom therein.

By disposing such a liquid crystal material in a device as illustrated in FIG. 3 and described below in details, multi-micro-domains were observed by a microscope as shown in FIG. 4(A). FIG. 4(B) is a sketch of the photograph of FIG. 4(A). The longest dimension of one domain was several micrometers to several hundreds of micrometers. The ratio of the longest dimension to the shortest dimension of the domain was about 5 to 500. Misalignment occurring in the liquid crystal material can be absorbed by boundaries 9 among the domains 8 so that defects like zigzag defects are unlikely. When driving signals are inputted to the device, high contrast images can be displayed throughout the entire device.

BRIEF DESCRIPTION OF THE DRAWINGS

The accompanying drawings, which are incorporated in and form a part of the invention and, together with the description, serve to explain the principles of the invention.

DETAILED DESCRIPTION OF THE PREFERRED EMBODIMENTS

Figure 3:
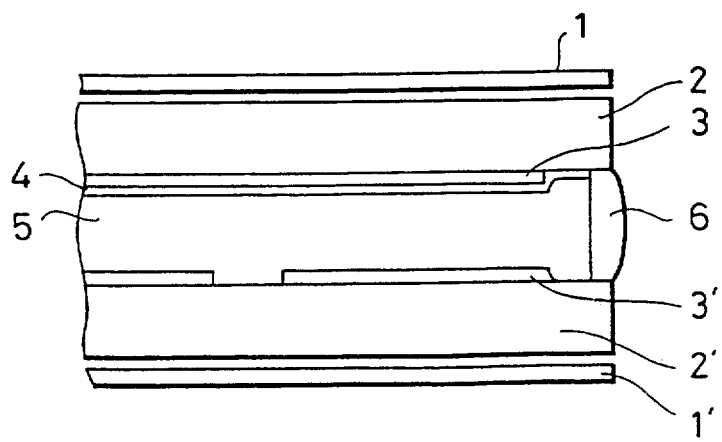
FIG. 3 is a schematic diagram showing a ferroelectric liquid crystal device in accordance with the present invention.

Referring to FIG. 3, a ferroelectric liquid crystal display in accordance with a preferred embodiment of the present invention will be explained.

The liquid crystal display comprises a pair of sodalime glass substrates 2 and 2'. The inside surfaces of the substrates 2 and 2' are formed with an electrode arrangement comprising a first set 3 of parallel conductive strips and a second set 3' of parallel conductive strips in an orthogonal relationship in order to form pixels arranged in a matrix. The electrode arrangement is formed by depositing an ITO film of 800 to 1200 Å thickness by reactive sputtering and etching it with a photoresist mask by the use of an acid etchant including ferric oxide (FeO) in the form of parallel strips. The sheet resistance of the electrodes is 15–25 Ω/. One of the substrates 2 is coated with an orientation control film 4 covering the electrode set 3.

The orientation control film 4 is made of an organic resin, e.g. a polyimide (LQ5200 manufactured by Hitachi Chemical Co., Ltd., LP-64 manufactured by Toray Industries, Inc., or JIB manufactured by Japan Synthetic Rubber Ltd.), a nylon such as 6-nylon or 6-6-nylon, or a Langmuir-Blodgett film prepared from a precursor of a polyimide or a polyamide. The control film 4 is coated on the substrate 2 over the electrode set 3 by spin coating, offset press printing or any other suitable method depending upon the material, followed by thermal annealing. The temperature of the annealing is 100°–130° C. in the case of nylons, 250°–300° C., preferably 280°–300° C. in the case of polyimides. The thickness of the film 4 is 100–500 Å. Rubbing treatment is given thereto in one direction as a one-axis orientation treatment by the use of a cotton velvet having piles of 2.5 to 3 mm height and turning at 1000 to 1500 rpm with respect to the substrate moving at 100 to 400 cm/min.

After dusting spacers of 2.5 μm silicon oxide particles on the orientation control film 4, the substrate 2 is joined with the other substrate 2' given no orientation treatment followed by injection therebetween of a ferroelectric liquid crystal 5 which is heated in advance to be an isotropic liquid crystal by utilizing the differential pressure between the external space and the inside of the device (vacuum method). A sealing 6 is provided to avoid loss of the liquid crystal. The spacing between the substrates 2 and 2' is about 2.5 μm. Numerals 1 and 1' designate a pair of polarizing plates.

The liquid crystal 5 is prepared by mixing materials as follow:

| Chemical Formula | Mol % |
|---|---|
| $C_{12}H_{25}$—⟨N=N⟩—⟨ ⟩—$OC_{10}H_{21}$ | 1.81 |
| $C_{12}H_{25}$—⟨N=N⟩—⟨ ⟩—$OC_8H_{17}$ | 10.77 |
| $C_{10}H_{21}$—⟨N=N⟩—⟨ ⟩—$OC_{12}H_{25}$ | 1.78 |
| $C_{10}H_{21}$—⟨N=N⟩—⟨ ⟩—$OC_{11}H_{23}$ | 1.71 |
| $C_{10}H_{21}$—⟨N=N⟩—⟨ ⟩—$OC_8H_{17}$ | 10.86 |
| $C_9H_{19}$—⟨N=N⟩—⟨ ⟩—$OC_{10}H_{21}$ | 7.46 |
| $C_9H_{19}$—⟨N=N⟩—⟨ ⟩—$OC_8H_{17}$ | 15.43 |
| $C_8H_{17}$—⟨N=N⟩—⟨ ⟩—$OC_{10}H_{21}$ | 14.38 |
| $C_8H_{17}$—⟨N=N⟩—⟨ ⟩—$OC_{11}H_{23}$ | 4.59 |

-continued

| Chemical Formula | Mol % |
|---|---|
| $C_{12}H_{25}$—⟨N=N⟩—⟨F⟩—O—CH$_2$CH*(F)—C$_3$H$_7$ | 11.18 |
| $C_{12}H_{25}$—⟨N=N⟩—⟨ ⟩—O—CH$_2$C*(F)—C$_3$H$_7$ | 10.02 |
| $C_{12}H_{25}O$—⟨ ⟩—COO—⟨F⟩—$COOC_8H_{17}$ | 10.01 |

The phase transition of the liquid crystal is as shown in below.

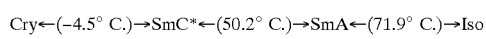

Cry←(−4.5° C.)→SmC*←(50.2° C.)→SmA←(71.9° C.)→Iso

The liquid crystal exhibited a spontaneous polarization of 7.0 nC/cm$^2$ at 25° C. which was calculated through measurement of current caused by displacement inversion in response to application of triangular pulses of ±5 V/μm. The response speed to ±10 V/μm square wave input pulses is as high as 27 μsec at 25° C. Multi-micro-domains were observed by a polarizing microscope in this condition and no zig-zag defect was confirmed. The contrast ratio was 20 when the liquid crystal display was driven by 4-pulse multiplex operation at a bias ratio of ¼.

The liquid crystal display as shown in FIG. 3 is filled with another liquid crystal material prepared by mixing materials as follow for demonstrating a second embodiment of the present invention:

| Chemical Formula | Mol % |
|---|---|
| $C_{12}H_{25}$—⟨N=N⟩—⟨ ⟩—$OC_8H_{17}$ | 1.9 |
| $C_{12}H_{25}$—⟨N=N⟩—⟨ ⟩—$OC_{10}H_{21}$ | 1.9 |
| $C_{10}H_{21}$—⟨N=N⟩—⟨ ⟩—$OC_{12}H_{25}$ | 2.4 |
| $C_{11}H_{23}$—⟨N=N⟩—⟨ ⟩—$OC_9H_{19}$ | 3.2 |

-continued

| Chemical Formula | Mol % |
|---|---|
| 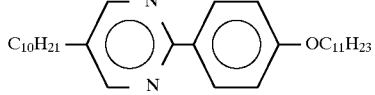 | 3.1 |
| 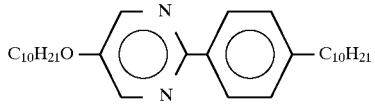 | 6.3 |
| 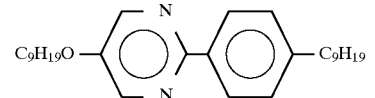 | 6.7 |
| 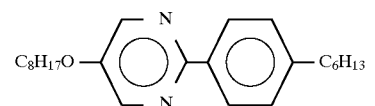 | 9.6 |
| 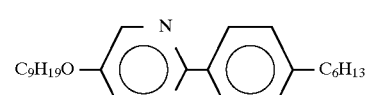 | 11.5 |
| 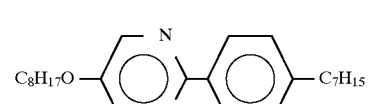 | 6.8 |
|  | 7.3 |
| 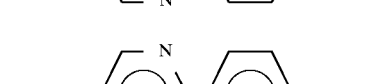 | 8.7 |
| 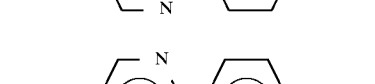 | 5.3 |
| 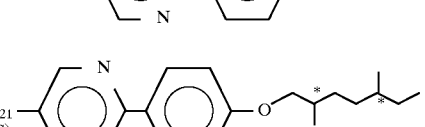 | 10.5 |
| 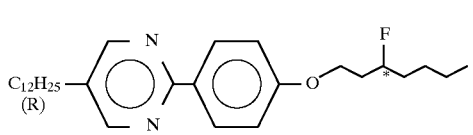 | 1.5 |
| 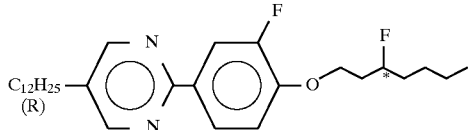 | 2.0 |

-continued

| Chemical Formula | Mol % |
|---|---|
| 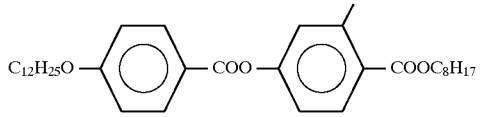 | 11.01 |

The phase transition of the liquid crystal is as shown in below.

$$Cry \leftarrow (-7.4° C.) \rightarrow SmC^* \leftarrow (48° C.) \rightarrow SmA \leftarrow (74° C.) \rightarrow Iso$$

The liquid crystal exhibited a spontaneous polarization of 12.3 $nC/cm^2$ at 25° C. which was calculated through measurement of current caused by displacement inversion in response to application of triangular pulses of ±5 V/μm. The response speed to ±10V/μm square wave input pulses is as high as 21 μsec at 25° C. Multi-micro-domains were observed by a microscope in this condition and no zig-zag defect was confirmed. The contrast ratio was 11 when the liquid crystal display was driven by 4-pulse multiplex operation at a bias ratio of ¼.

As a comparative example, a liquid crystal is prepared by mixing materials as follow and disposed in the liquid crystal display shown in FIG. 3:

| Chemical Formula | Mol % |
|---|---|
| 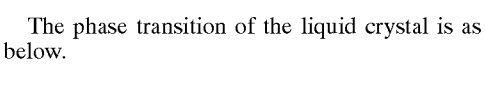 | 17.84 |
| 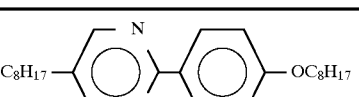 | 19.21 |
| 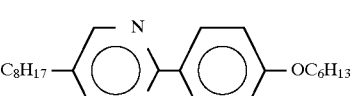 | 19.21 |
| 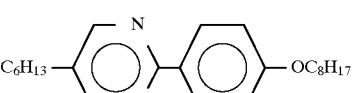 | 16.68 |
| 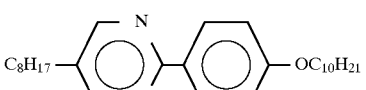 | 17.83 |
| 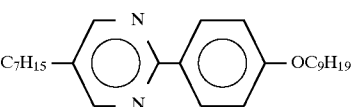 | 9.23 |

The phase transition of the liquid crystal is as shown in below.

$$Cry \leftarrow (1.0° C.) \rightarrow SmC^* \leftarrow (47.7° C.) \rightarrow SmA \leftarrow (56° C.) \rightarrow N \leftarrow (65.5° C.) \rightarrow Iso$$

The liquid crystal exhibited a spontaneous polarization of 2.6 $nC/cm^2$ at 25° C. The response speed to ±10 V/μm square wave input pulses is as low as 126 μsec at 25° C. The contrast ratio obtained was 3 or less.

As another comparative example, a liquid crystal is prepared by mixing materials as follow and disposed in the liquid crystal display shown in FIG. 3:

| Chemical Formula | Mol % |
|---|---|
| 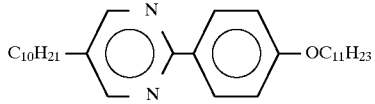 C₁₀H₂₁—⟨N⟩—⟨⟩—OC₁₁H₂₃ | 9.9 |
| 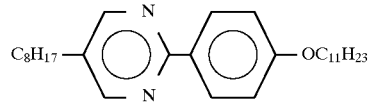 C₈H₁₇—⟨N⟩—⟨⟩—OC₁₁H₂₃ | 10.2 |
| 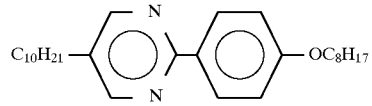 C₁₀H₂₁—⟨N⟩—⟨⟩—OC₈H₁₇ | 11.5 |
| 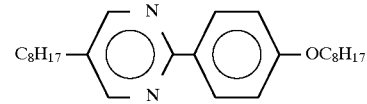 C₈H₁₇—⟨N⟩—⟨⟩—OC₈H₁₇ | 10.7 |
| 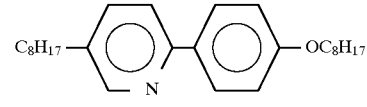 C₈H₁₇—⟨⟩—⟨⟩—OC₈H₁₇ (N) | 11.3 |
| 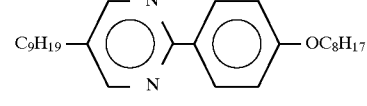 C₉H₁₉—⟨⟩—⟨⟩—OC₈H₁₇ (N) | 11.9 |
| 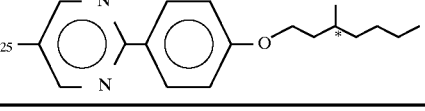 C₁₂H₂₅—⟨N⟩—⟨⟩—O—CH(F)— | 23.6 |

The phase transition of the liquid crystal is as shown in below.

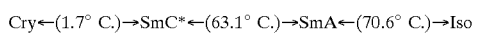

Cry←(1.7° C.)→SmC*←(63.1° C.)→SmA←(70.6° C.)→Iso

Figure 5:
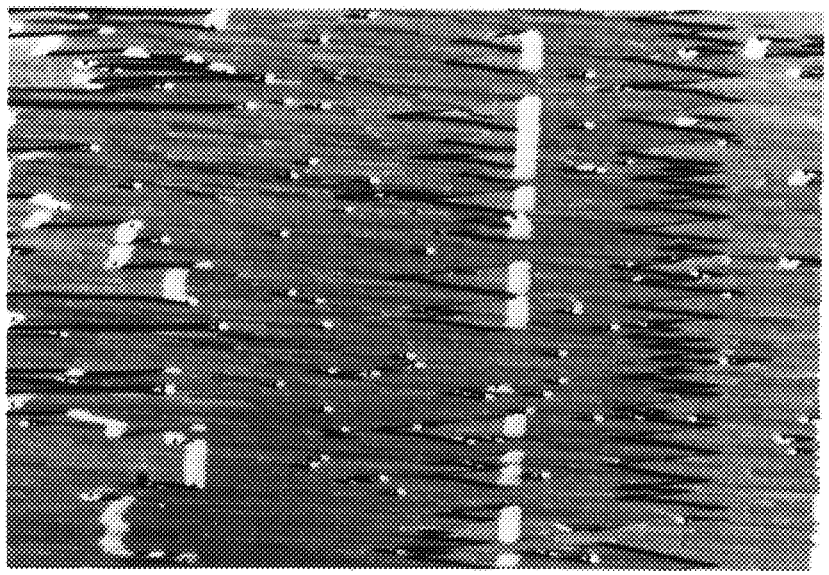
FIG. 5 is a copy of a photograph taken by a polarizing microscope showing zig-zag defects in accordance with prior art.

In this case, a number of typical zig-zag defects were observed by a microscope as shown in FIG. 5. The response speed to ±10 V/μm square wave input pulses is 43 μsec at 25° C. The contrast ratio obtained was as low as 1.5 because of the zig-zag defects.

Next, a third embodiment in accordance with the present invention will be explained. The liquid crystal disposed in the display shown in FIG. 3 is prepared by mixing materials as follow:

| Chemical Formula | Mol % |
|---|---|
| 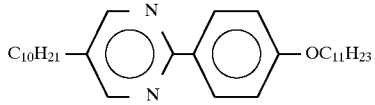 C₁₀H₂₁—⟨N⟩—⟨⟩—OC₁₁H₂₃ | 9.1 |
| 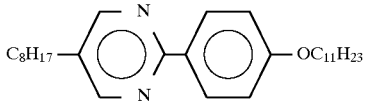 C₈H₁₇—⟨N,N⟩—⟨⟩—OC₁₁H₂₃ | 9.6 |
| 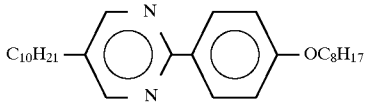 C₁₀H₂₁—⟨N,N⟩—⟨⟩—OC₈H₁₇ | 10.0 |
|  C₉H₁₉—⟨N⟩—⟨⟩—OC₁₂H₂₅ | 9.7 |
| 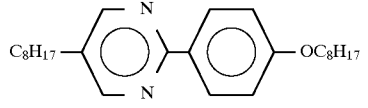 C₈H₁₇—⟨N,N⟩—⟨⟩—OC₈H₁₇ | 10.0 |
| 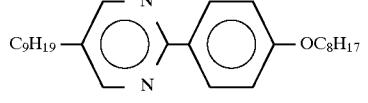 C₉H₁₉—⟨N⟩—⟨⟩—OC₈H₁₇ | 9.9 |
| 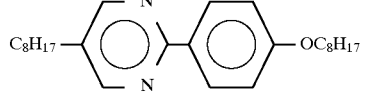 C₈H₁₇—⟨N⟩—⟨⟩—OC₈H₁₇ | 10.9 |
|  C₁₂H₂₅—⟨N⟩—⟨⟩—O—CH(F)— | 21.1 |
| 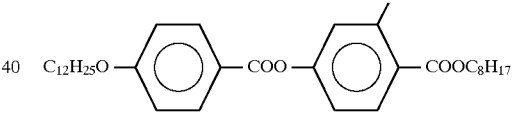 C₁₂H₂₅O—⟨⟩—COO—⟨⟩(F)—COOC₈H₁₇ | 9.7 |

The phase transition of the liquid crystal is as shown in below.

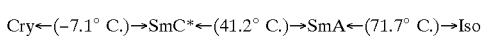

Cry←(−7.1° C.)→SmC*←(41.2° C.)→SmA←(71.7° C.)→Iso

Figure 6:
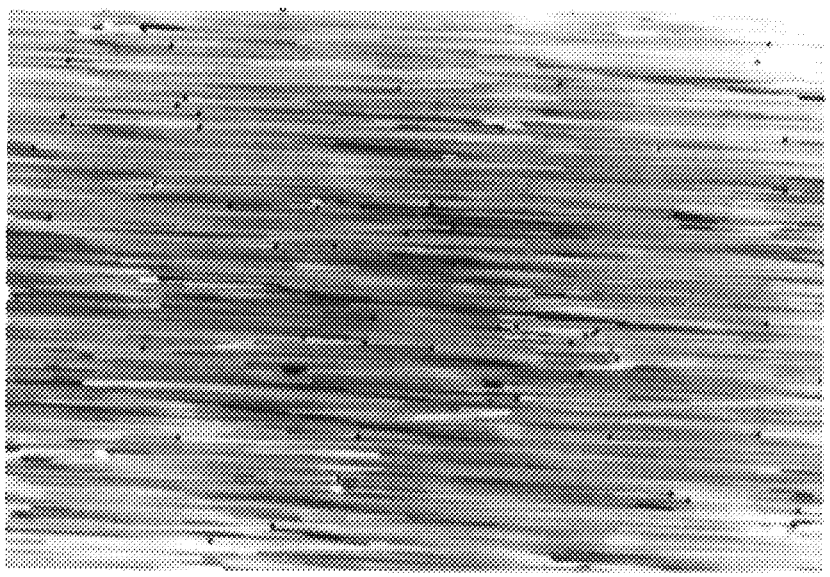
FIG. 6 is a copy of a photograph taken by a polarizing microscope showing multi-micro-domains in accordance with the present invention.

Multi-micro-domains were observed by a polarizing microscope as shown in FIG. 6 and no zig-zag defect was confirmed throughout the display. The response speed to ±10 V/μm square wave input pulses is as high as 26.4 μsec at 25° C. The contrast ratio was 10 when the liquid crystal display was driven by 4-pulse multiplex operation at a bias ratio of ¼.

The dependence of the contrast ratio on the combination of the orientation control films in the display shown in FIG. 3 was examined. When both the substrates 2 and 2' were coated with polyimide films which were subsequently given rubbing treatment, a number of zig-zag defects were observed and the contrast ratio was measured to be 2. When the substrate 2 was coated with a polyimide film and given rubbing treatment thereafter and the substrate 2' was coated with a SiO₂ film, multi-micro-domains were observed and the contrast ratio was measured to be 13. When the substrate 2 was coated with a polyimide film and given rubbing treatment thereafter and the substrate 2' carrying the electrode set 3' was not coated with any film, multi-micro-domains were observed and the contrast ratio was measured to be 20. In the experiments, polyimide LP-64 manufactured by Toray Industries Inc. and $SiO_2$ ZQ-2 manufactured by Catalyst Chemicals Corp. were used. These films were formed to a thickness of 100 to 500 Å and thermal annealed at 280° C. Thus, it is preferred that only one of the inside surfaces of the substrates is provided with an orientation control surface, e.g. the rubbed surface of polyimide film, thereon.

Figure 7:
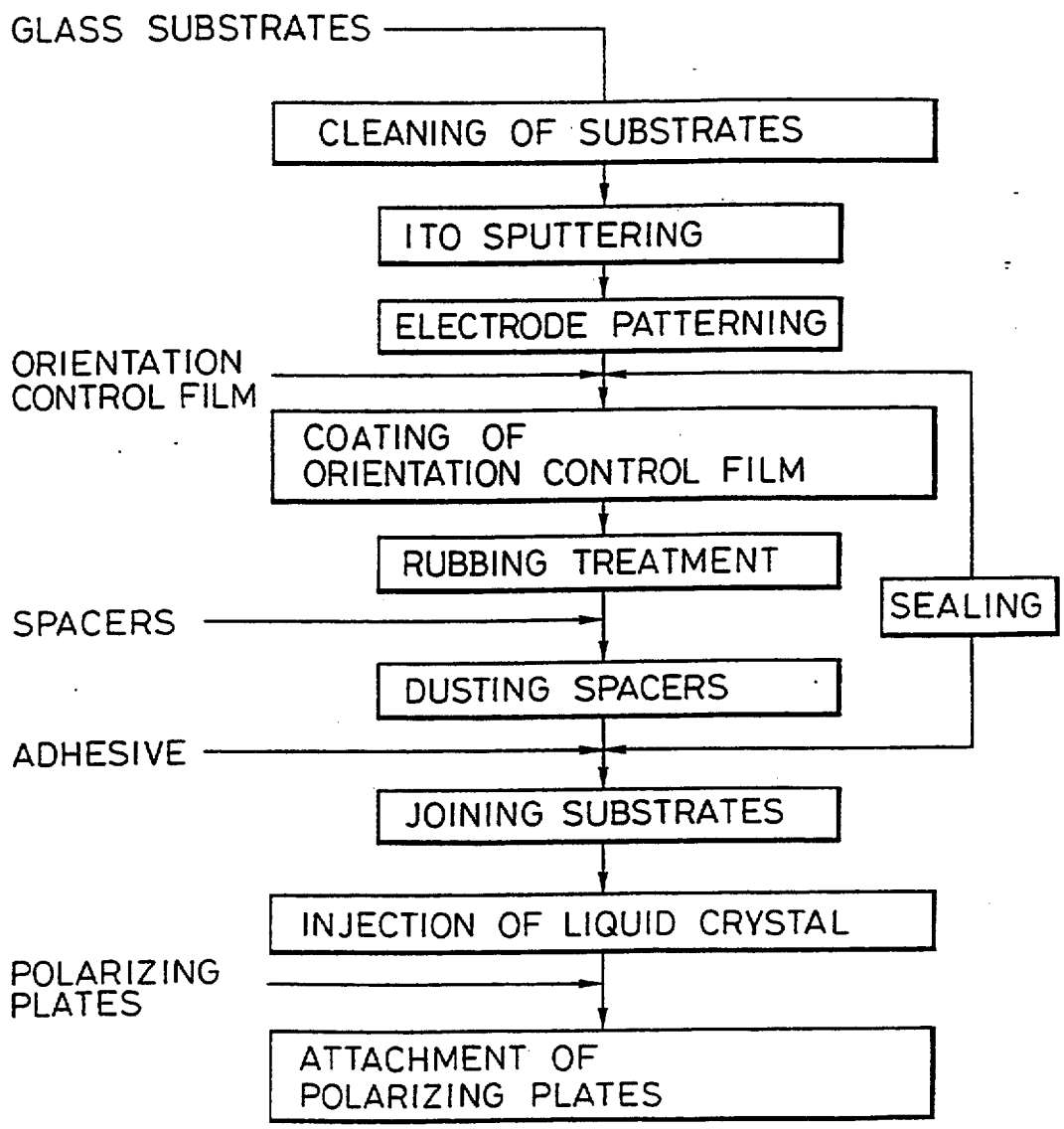
FIG. 7 is a flow chart showing a method of manufacturing liquid crystal display in accordance with the present invention.
Figure 8:
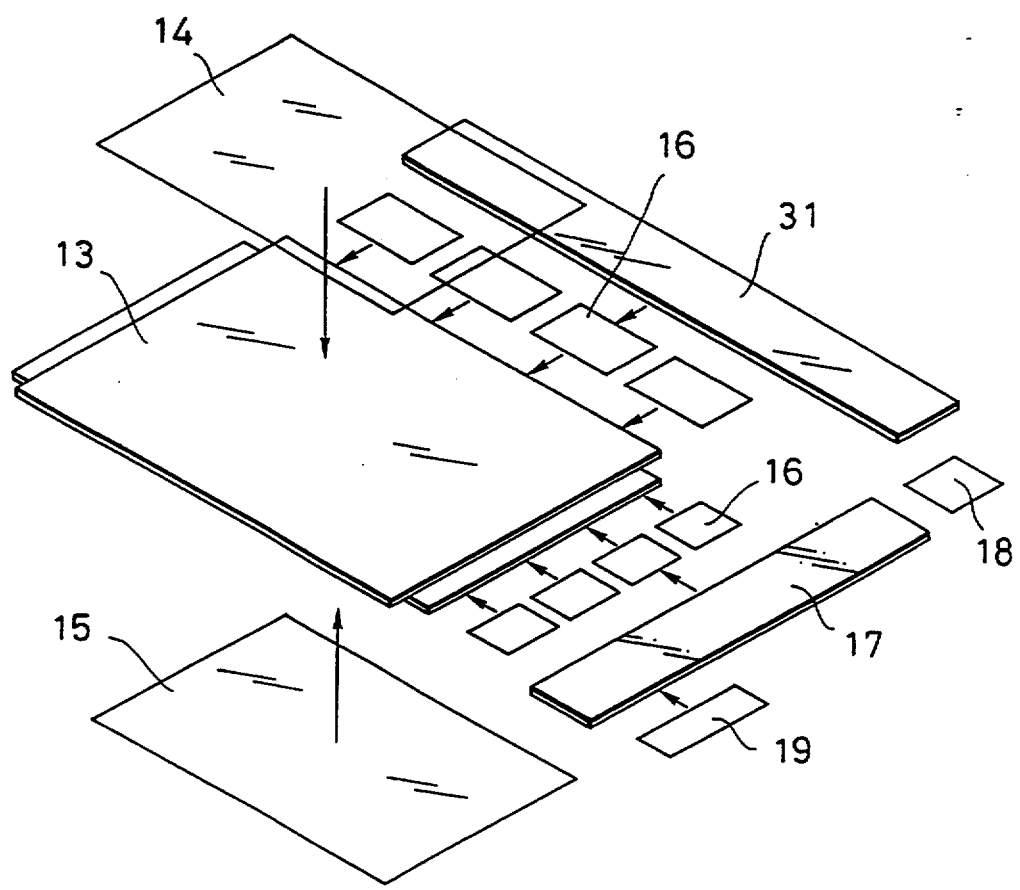
FIG. 8 is a perspective diagram showing a ferroelectric liquid crystal device in accordance with the present invention.

Next, a method of manufacturing a liquid crystal display of 640 (horizontal)×400 (vertical) in accordance with the present invention will be explained with reference to FIGS. 3 and 8 and the flow chart shown in FIG. 7.

After cleaning sodalime glass substrates, the inside surfaces of the substrates 2 and 2' are formed with an electrode arrangement comprising a pair of parallel electrode sets 3 and 3' in an orthogonal relationship in order to form pixels arranged in a matrix. The width of the electrodes is 250 μm. The spacing between adjacent electrodes is 250 μm. The electrode arrangement is formed by depositing an ITO film of 1200 Å thickness by sputtering and etching it with a photoresist mask by the use of an acid etchant including ferric oxide (FeO). The sheet resistance of the electrodes is 15–25 Ω/. One of the substrates is coated with an orientation control film 4 covering the electrode set 3.

The orientation control film 4 is made of an organic resin, e.g. a nylon or a polyimide (LQ5200 manufactured by Hitachi Chemical Co., Ltd., LP-64 manufactured by Toray Industries, Inc., or JIB manufactured by Japan Synthetic Rubber Ltd.). One of these organic materials is coated on the substrate 1 over the electrode set 3 by spin coating, offset press printing or any other suitable method depending upon the material, followed by thermal annealing. The temperature of the annealing is 100°–130° C. in the case of nylons, 250°–300° C., preferably 280°–300° C. in the case of polyimides. The thickness of the film 4 is 100–500 Å. Rubbing treatment is given thereto as a one-axis orientation treatment by the use of a cotton velvet having piles of 2.5 to 3 mm height and turning at 1000 to 1500 rpm with respect to the substrate moving at 100 to 400 cm/min.

After dusting spacers of 2.5 μm silicon oxide particles on the orientation control film 4 and forming the sealing 6 on the substrates, the substrate 2 is joined with the other substrate 2' given no orientation treatment followed by injection therebetween of a ferroelectric liquid crystal which is heated to be an isotropic liquid crystal by utilizing the differential pressure between the external space and the inside of the device (vacuum method). Finally, a pair of polarizing plates 1 and 1' are attached to the substrates 2 and 2'. In accordance with this embodiment, a connector or flexible printed circuit 19 is connected with a printed circuit board 17 which, in turn, is connected with a printed circuit board 31 through a connector or flexible printed circuit 18 as illustrated in FIG. 8. The printed circuit boards 17 and 31 are connected with the periphery of the liquid crystal panel 13 through tape-automated-bondings (TABs) 16 as illustrated in FIG. 8. Signals are supplied to the connector or flexible printed circuit 19 from a controller 103 shown in FIG. 10. In FIG. 8, reference numerals 14 and 15 designate polarizing plates.

Figure 9:
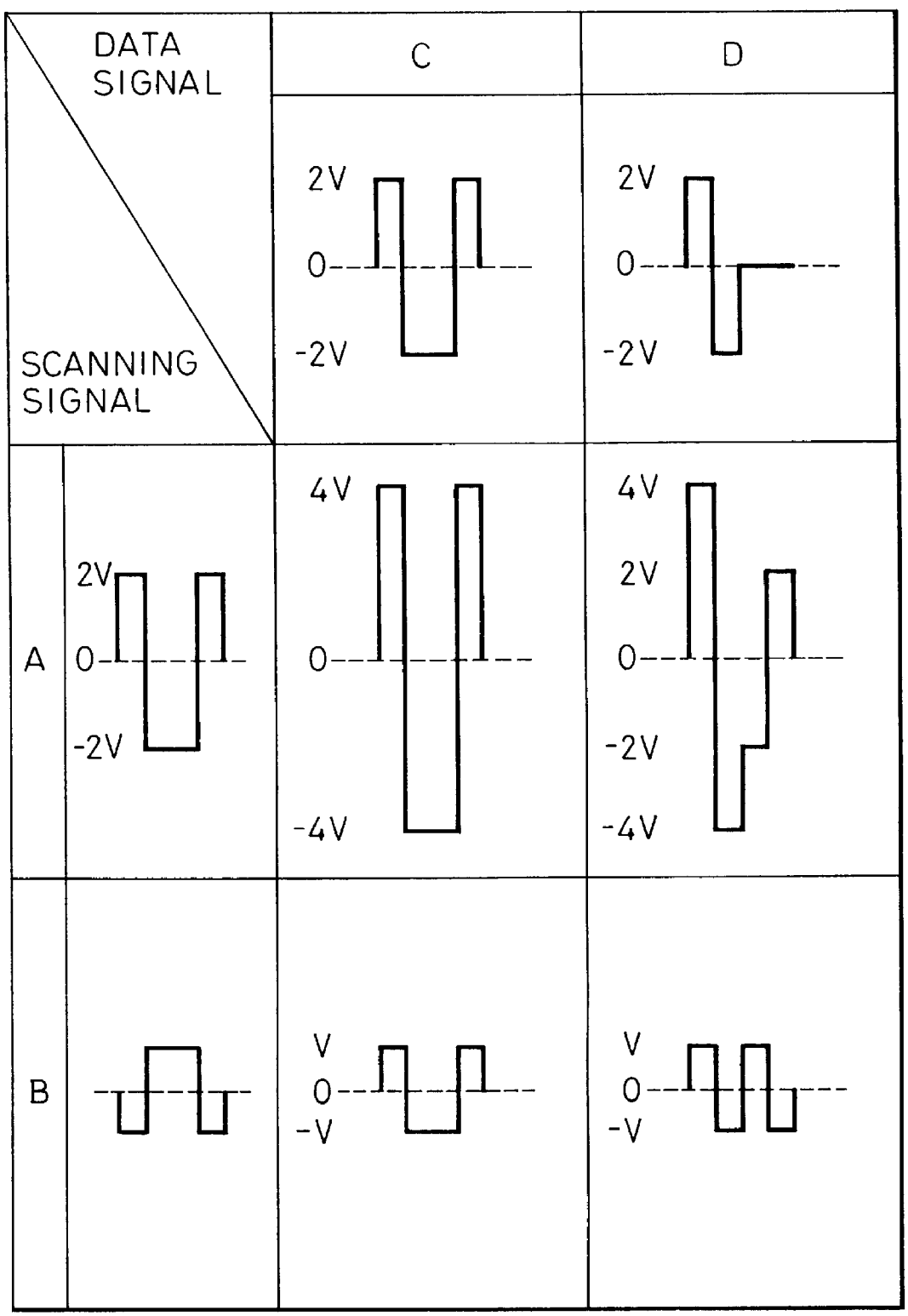
FIG. 9 is a graphical diagram for explaining a method of driving a ferroelectric liquid crystal device in accordance with the present invention.
Figure 10:
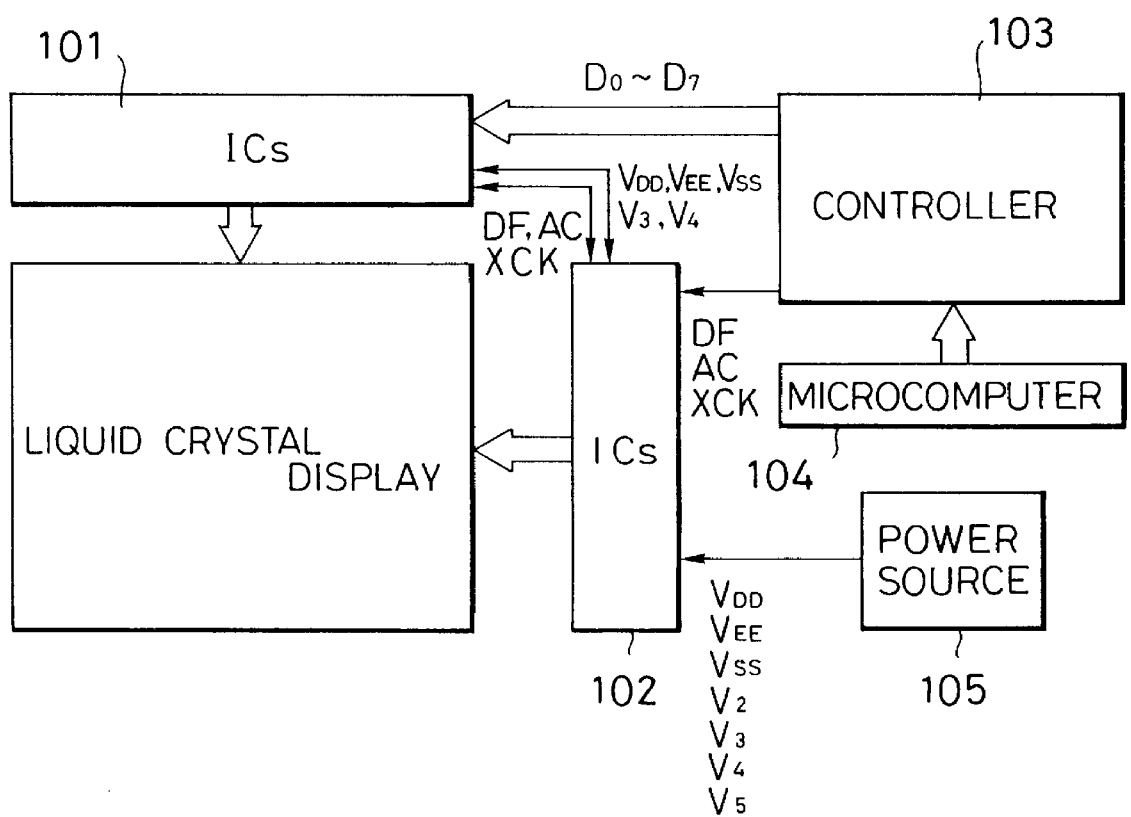
FIG. 10 is a schematic diagram showing peripheral circuits for driving a ferroelectric liquid crystal device in accordance with the present invention.
Figure 1:
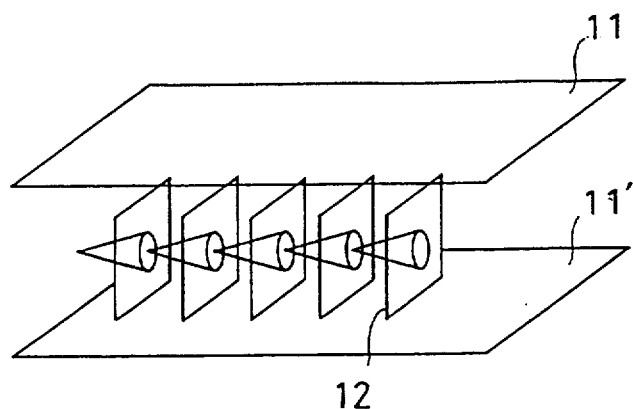
Figure 2:
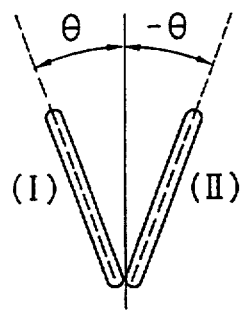
FIG. 2 is an explanatory diagram showing two stable states in a ferroelectric liquid crystal device.

An exemplary method of driving the liquid crystal display will be explained with reference to FIG. 9. FIG. 9 shows the voltage applied across the liquid crystal in response to signals A, B, C and D selectively applied to the electrode sets 3 and 3'. In the figure, the signal A (selection signal) is to be applied to an electrode strip of the set 3 corresponding to a selected column during scanning; the signal B (non-selection signal) is to be applied to electrode strips of the set 3 corresponding to non-selected columns during scanning; the signal C is to be applied to an electrode(s) of the set 3' corresponding to a selected pixel(s) (white pixel) of the selected column; and the signal D is to be applied to an electrode(s) of the set 3' corresponding to a non-selected pixel(s) (black pixel) of the selected column. FIG. 10 is a block diagram showing a peripheral circuitry for driving the liquid crystal display. The peripheral circuitry comprises ICs for driving liquid crystal display 101, ICs for driving liquid crystal display 102, a controller 103, a microcomputer 104 and a power source 105 as illustrated in FIG. 10. Image data are supplied from the microcomputer 104 and received by the controller 103. The controller 103 supplies signals to the liquid crystal display through the ICs 101 and 102. The liquid crystal display is then driven.

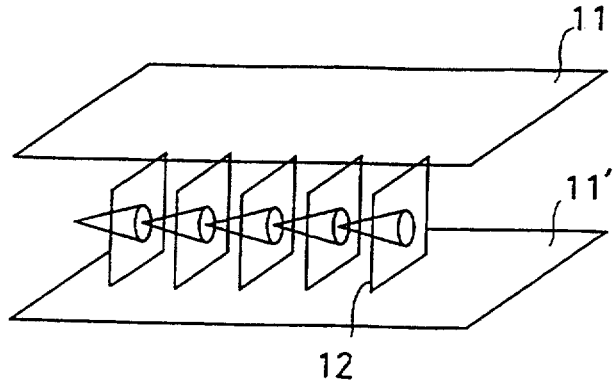

What is claimed is:

1. A ferroelectric liquid crystal device comprising:

a pair of substrates, at least one of which is transparent;

an electrode arrangement provided on the inside surface of said substrates;

an orientation control surface provided on the inside surface of at least one of said substrates to produce an orientation control effect in proximate ferroelectric liquid crystal, where each inside surface of the substrates has a different said orientation control effect than the other inside surface;

a liquid crystal layer comprising a ferroelectric liquid crystal as a constituent thereof and disposed between said substrates, wherein said ferroelectric liquid crystal comprises an optically active first liquid crystal at 2–30 mol %, an achiral base second liquid crystal at 55–80 mol % and a third liquid crystal at 2–15 mol %, wherein said first liquid crystal is represented by a formula:

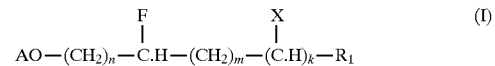

where "A" stands for

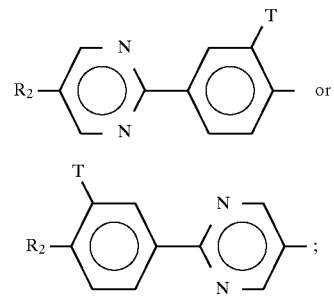

$R_1$ is a straight chain alkyl group comprising 2–8 carbon atoms; $R_2$ is a straight chain alkyl group comprising 8–12 carbon atoms; T is a hydrogen atom or a fluorine atom; X is a fluorine atom or a methyl group; n=1 or 2; m=0–3; k=0–1; and C* is an asymmetric carbon atom, said second liquid crystal is represented by a formula:

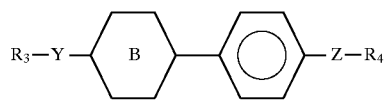 (II)

where 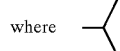 stands for

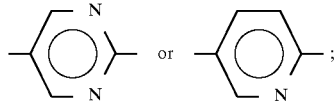 ;

$R_3$ and $R_4$ are straight chain or branched chain alkyl groups comprising 6–14 carbon atoms; Y and Z are a single bond or a —O— respectively, said third liquid crystal is represented by a formula:

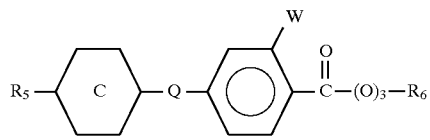 (III)

where 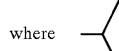 stands for

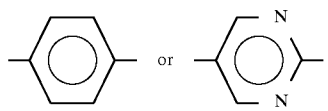 ;

$R_5$ is a straight chain alkyl or alkoxyl group comprising 6–14 carbon atoms; $R_6$ is a straight chain or branched chain alkyl group comprising 6–14 carbon atoms; Q is a single bond or —COO—; W is a hydrogen atom or a fluorine atom; J=0 or 1;

and wherein said liquid crystal exhibits a multi-microdomain orientation.

2. The ferroelectric liquid crystal device as claimed in claim 1 wherein said liquid crystal is in direct contact with said electrode arrangement at the other of said substrates.

3. The ferroelectric liquid crystal device as claimed in claim 1 wherein said orientation control surface is formed by forming an organic resin film on said one of said substrates and giving rubbing treatment in one direction.

4. The ferroelectric liquid crystal device as claimed in claim 3 wherein said organic resin film is a polyimide.

5. The ferroelectric liquid crystal device as claimed in claim 1 wherein said electrode arrangement comprises a first set of parallel conductive strips provided on said one of said substrates and a second set of parallel conductive strips provided on the other one of said substrates in an orthogonal relationship in order to form a number of pixels at their intersections.

6. The ferroelectric liquid crystal device as claimed in claim 1 wherein the alkyl group of $R_6$ comprises an asymmetric carbon atom therein.

7. The liquid crystal device of claim 1 wherein only one of the inside surfaces contiguous to the liquid crystal layer is rubbed.

8. The liquid crystal device of claim 7 wherein the rubbed surface comprises a polyimide.

9. The liquid crystal device of claim 7 wherein the surface other than said one surface comprises silicon oxide.

10. A ferroelectric liquid crystal device comprising:

a pair of substrates, at least one of which is transparent;

an electrode arrangement provided on the inside surface of said substrates;

an orientation control surface provided only one of the inside surface of said substrates to produce an orientation control effect in proximate ferroelectric liquid crystal, a liquid crystal layer comprising ferroelectric liquid crystal molecules as constituents thereof and disposed between said substrates, wherein said ferroelectric liquid crystal comprises an optically active first liquid crystal at 2–30 mol %, an achiral base second liquid crystal at 55–80 mol % and a third liquid crystal at 2–15 mol %, wherein said first liquid crystal is represented by a formula:

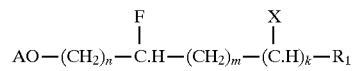 (I)

where "A" stands for

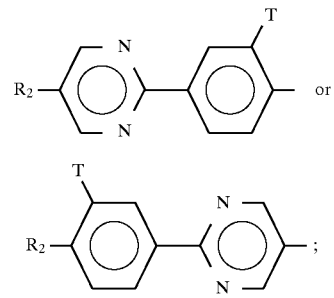

$R_1$ is a straight chain alkyl group comprising 2–8 carbon atoms; $R_2$ is a straight chain alkyl group comprising 8–12 carbon atoms; T is a hydrogen atom or a fluorine atom; X is a fluorine atom or a methyl group; n=1 or 2; m=0–3; k=0–1; and C* is an asymmetric carbon atom, said second liquid crystal is represented by a formula:

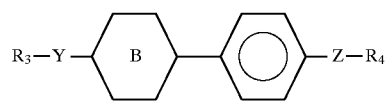 (II)

where 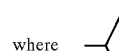 stands for

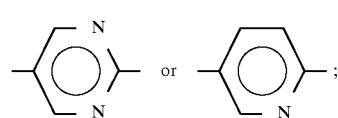 ;

$R_3$ and $R_4$ are straight chain or branched chain alkyl groups comprising 6–14 carbon atoms; Y and Z are a single bond or a —O— respectively, said third liquid crystal is represented by a formula:

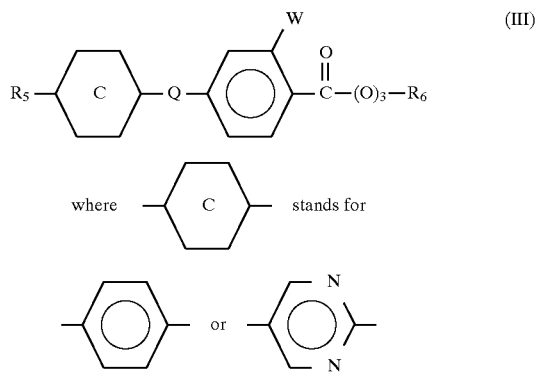

$R_5$ is a straight chain alkyl or alkoxyl group comprising 6–14 carbon atoms; $R_6$ is a straight chain or branched chain alkyl group comprising 6–14 carbon atoms; Q is a single bond or —COO—; W is a hydrogen atom or a fluorine atom; J=0 or 1;

and wherein said liquid crystal exhibits a multi-microdomain orientation.

11. The ferroelectric liquid crystal device as claimed in claim 10 wherein said orientation control surface is formed by forming an organic resin film on said one of said substrates and giving rubbing treatment in one direction.

12. The ferroelectric liquid crystal device as claimed in claim 11 wherein said organic resin film is a polyimide.

13. The ferroelectric liquid crystal device as claimed in claim 11 wherein said liquid crystal is in direct contact with said electrode arrangement at the other one of said inside surfaces.

14. The ferroelectric liquid crystal device as claimed in claim 13 wherein said electrode arrangement is made of indium tin oxide.

15. The ferroelectric liquid crystal device of claim 11 wherein said liquid crystal is in direct contact with a surface of a film comprising silicon oxide and provided on the other one of said inside surfaces.

16. The ferroelectric liquid crystal device as claimed in claim 10 wherein said electrode arrangement comprises a first set of parallel conductive strips provided on said one of the inside surfaces and a second set of parallel conductive strips provided on the other one of the inside surfaces in an orthogonal relationship in order to form a number of pixels at their intersections.

17. The ferroelectric liquid crystal device as claimed in claim 10 wherein the alkyl group of $R_6$ comprises an asymmetric carbon atom therein.

* * * * *

UNITED STATES PATENT AND TRADEMARK OFFICE
CERTIFICATE OF CORRECTION

PATENT : 5,827,448

DATED : October 27, 1998

INVENTOR(S) : Konuma et al

Page 1 of 5

It is certified that error appears in the above-identified patent and that said Letters Patent is hereby corrected as shown below:

The title page, showing the illustrative Figure should be deleted and substitute therefor the attached title page.

Figure 1:
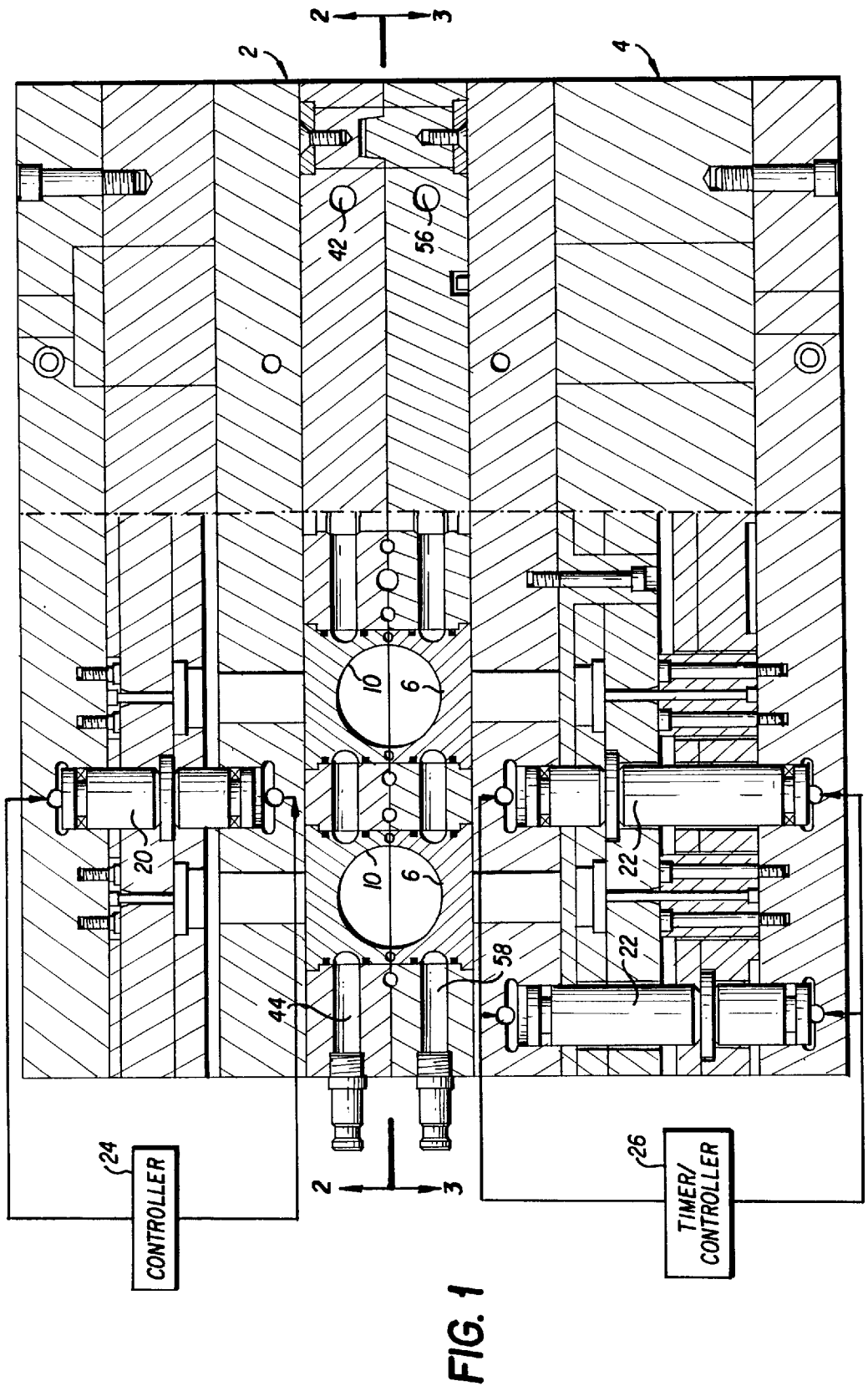
FIG. 1 is a schematic diagram showing a prior art liquid crystal device.
Figure 4A:
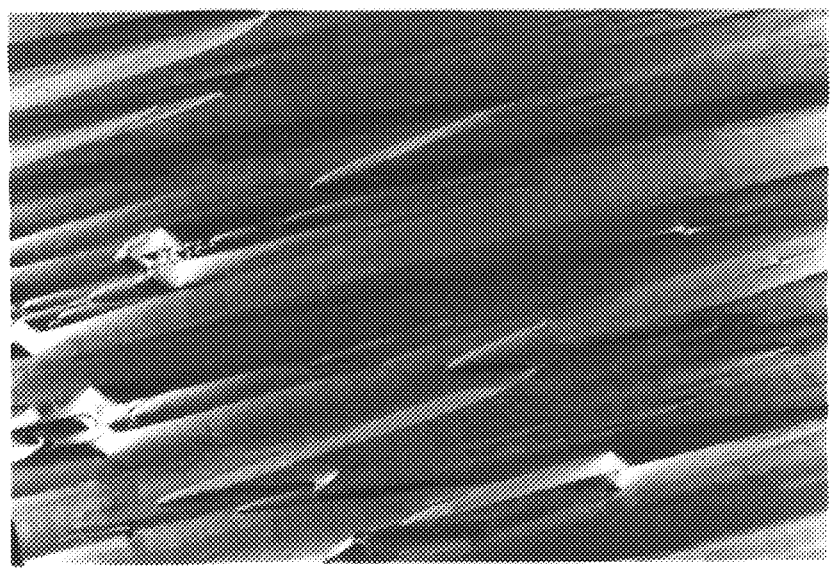
FIG. 4(A) is a copy of a photograph taken by a polarizing microscope showing multi-micro-domains in accordance with the present invention.
Figure 4B:
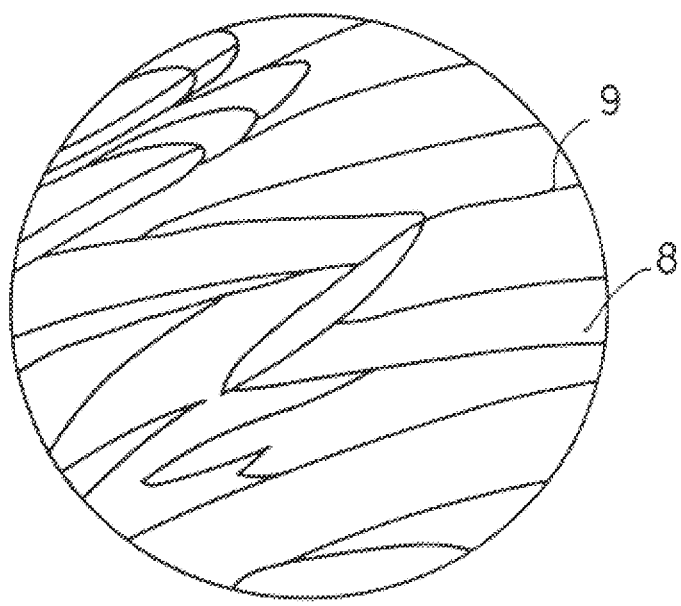
FIG. 4(B) is a schematic illustration of the photograph of FIG. 4(A).
Figure 4:
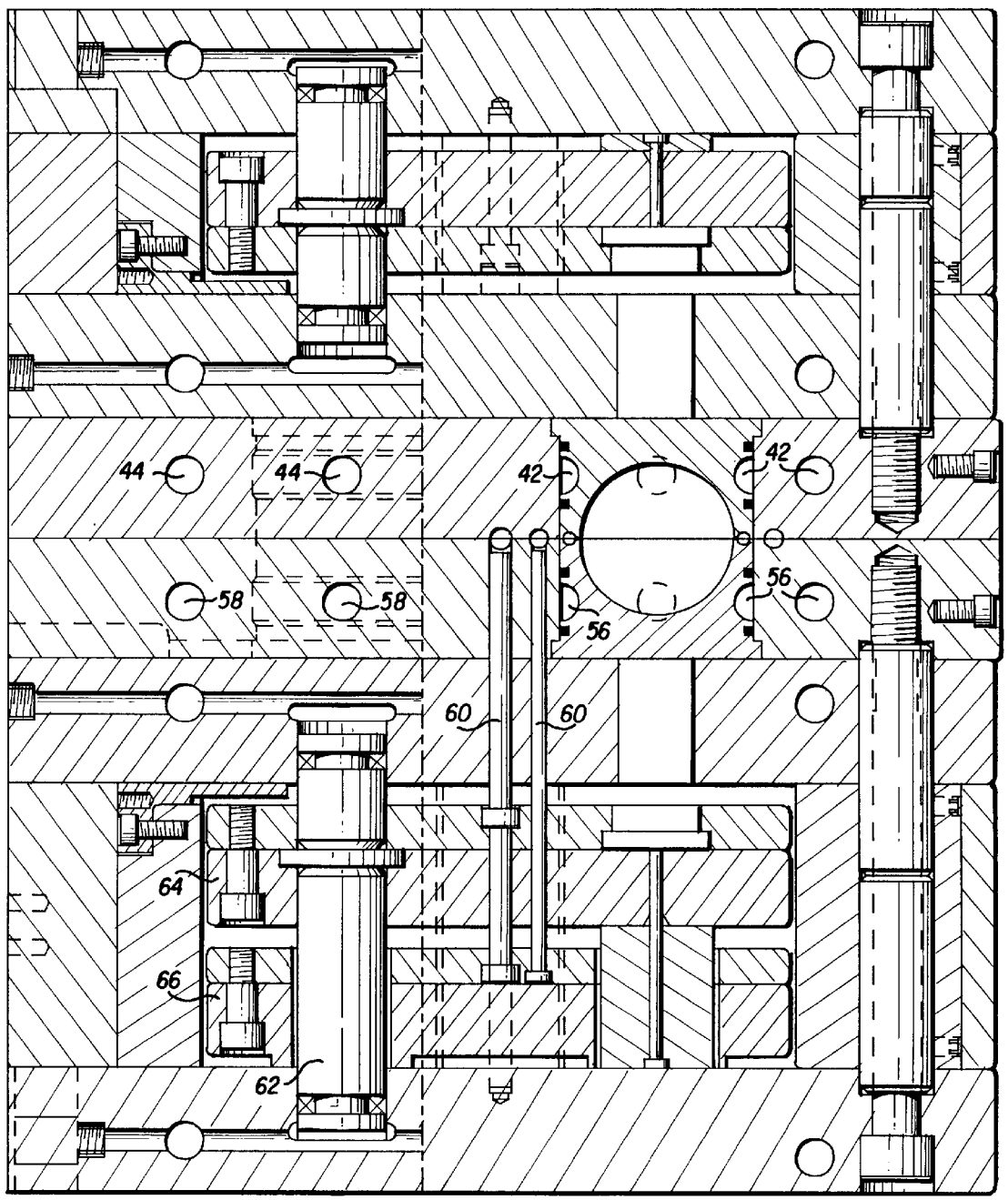
Figure 5:
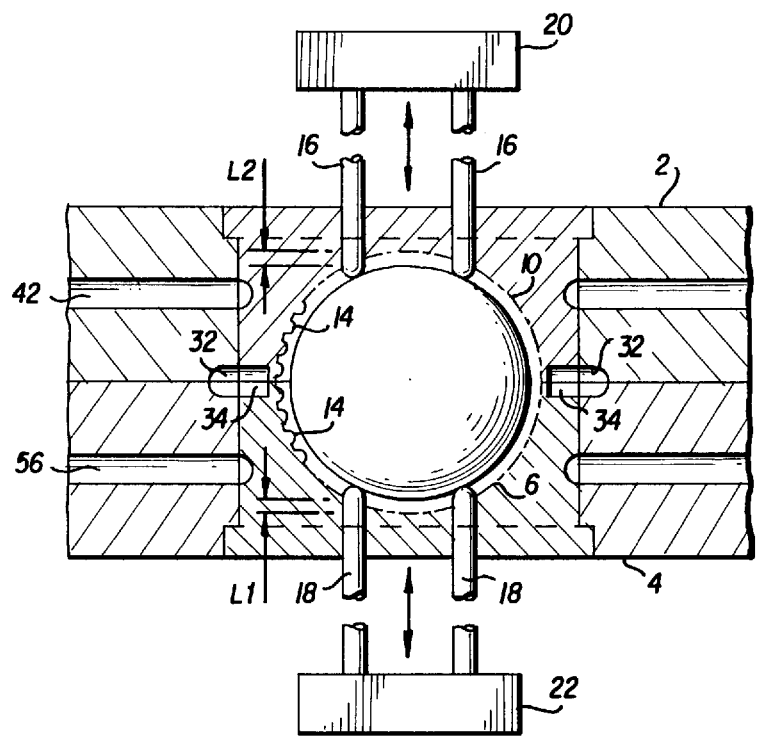

In the drawings, delete the Sheets consisting of Figs. 1, 4 and 5, and substitute therefor the corrected Sheets consisting of Figs. 1, 4 and 5, as shown on the attached pages.

Signed and Sealed this

Twenty-fifth Day of April, 2000

Attest:

Q. TODD DICKINSON

*Attesting Officer*

*Director of Patents and Trademarks*

United States Patent [19]

Konuma et al.

[11] Patent Number: 5,827,448
[45] Date of Patent: Oct. 27, 1998

[54] FERROELECTRIC LIQUID CRYSTAL DEVICE

[75] Inventors: Toshimitsu Konuma, Kanagawa; Akira Mase, Aichi; Shunpei Yamazaki, Tokyo; Misao Yagi, Kanagawa; Hitoshi Kondo; Mika Tadokoro, both of Tokyo; Hiroko Konuma, Kanagawa; Hiroshi Sugiyama, Tokyo; Toshimitsu Hagiwara, Kanagawa, all of Japan

[73] Assignee: Semiconductor Energy Laboratory Co., Ltd., Japan

[21] Appl. No.: 791,189

[22] Filed: Nov. 13, 1991

[30] Foreign Application Priority Data

Nov. 16, 1990 [JP] Japan .................... 2-312533

[51] Int. Cl.$^6$ .................... C09K 19/34; C09K 19/52; C09K 19/36; G02F 1/1337
[52] U.S. Cl. .................... 252/299.61; 252/299.01; 252/299.4; 359/75
[58] Field of Search .................... 252/299.61, 299.01, 252/299.4; 359/75

[56] References Cited

U.S. PATENT DOCUMENTS

| | | | |
|---|---|---|---|
| 4,831,182 | 5/1989 | Higuchi et al. | 560/59 |
| 4,941,736 | 7/1990 | Taniguchi et al. | 359/103 X |
| 5,064,569 | 11/1991 | Geelhaar et al. | 252/299.65 |
| 5,120,466 | 6/1992 | Katagiri et al. | 252/299.01 |
| 5,120,468 | 6/1992 | Saito et al. | 252/299.61 |
| 5,130,048 | 7/1992 | Wand et al. | 252/299.01 |
| 5,132,147 | 7/1992 | Takiguchi et al. | 427/393.5 |
| 5,133,895 | 7/1992 | Ogawa et al. | 252/299.4 |
| 5,135,678 | 8/1992 | Murata et al. | 252/299.4 |
| 5,169,556 | 12/1992 | Mochizuki et al. | 252/299.62 |

FOREIGN PATENT DOCUMENTS

| | | |
|---|---|---|
| 0267585 | 5/1988 | European Pat. Off. |
| 0326086 | 8/1989 | European Pat. Off. |

*Primary Examiner*—C. H. Kelly
*Attorney, Agent, or Firm*—Sixbey, Friedman, Leedom & Ferguson, P.C.; Gerald J. Ferguson, Jr.; Joan K. Lawrence

[57] ABSTRACT

A ferroelectric liquid crystal device is described. The device comprises a pair of substrates, an electrode arrangement formed on the inside surface of the substrates, an orientation control surface provided on the inside surface of one of said substrates, and a blended ferroelectric liquid crystal disposed between the substrates. By suitably preparing the liquid crystal, multi-micro-domains are formed in the liquid crystal. By virtue of the multi-micro-domains, the contrast ratio and the response speed are significantly improved.

17 Claims, 7 Drawing Sheets